Nov. 13, 1923.
W. W. GORE
DUST SPRAYER
Filed July 10, 1922
1,473,787
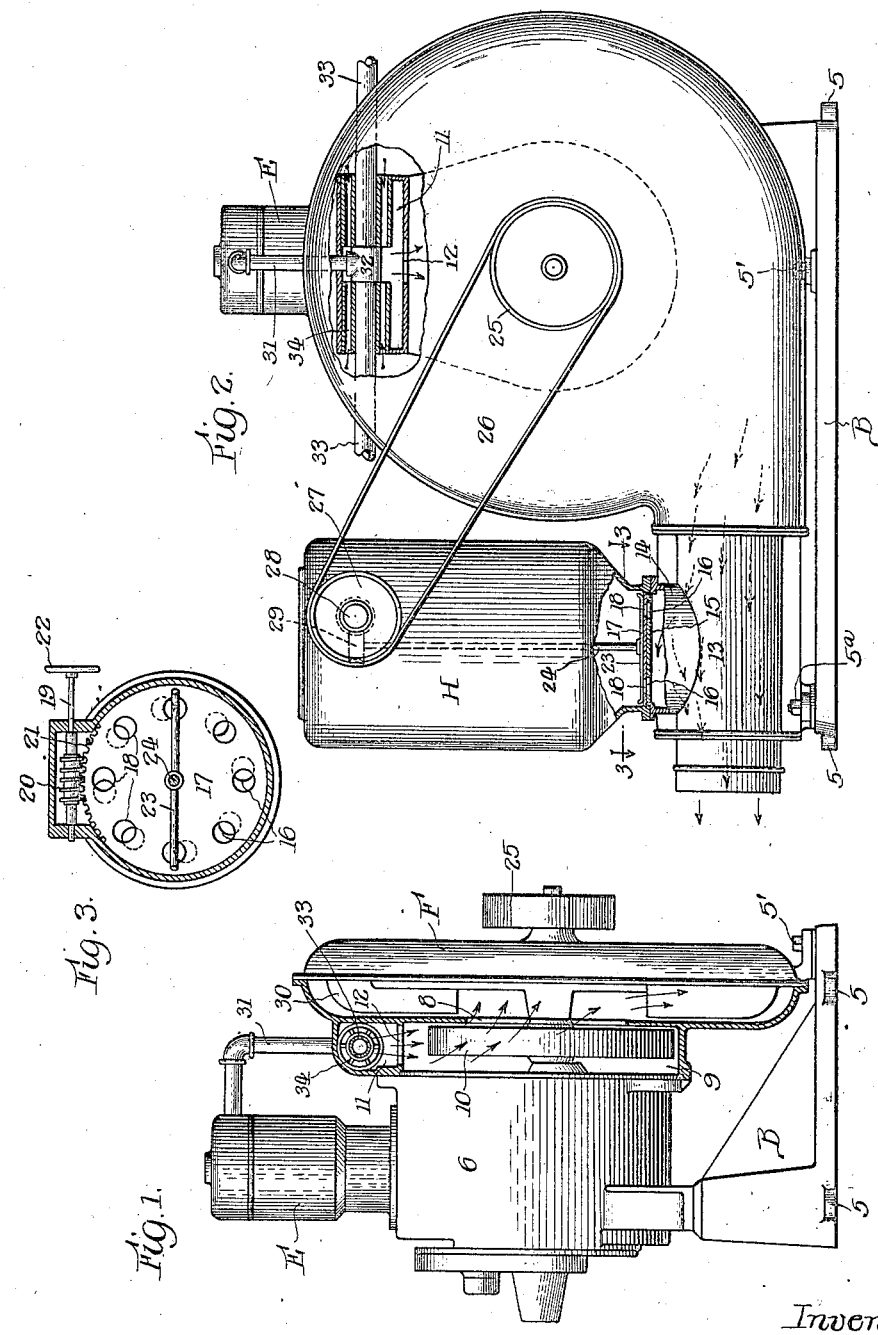
Inventor:
Warren W. Gore,
By Samuel N. Pond,
Atty
Witness:
A. J. Sauser.

Patented Nov. 13, 1923.

1,473,787

UNITED STATES PATENT OFFICE.

WARREN W. GORE, OF MADISON, WISCONSIN, ASSIGNOR TO FULLER & JOHNSON MFG. CO., OF MADISON, WISCONSIN, A CORPORATION OF WISCONSIN.

DUST SPRAYER.

Application filed July 10, 1922. Serial No. 574,010.

*To all whom it may concern:*

Be it known that I, WARREN W. GORE, a citizen of the United States, residing at Madison, in the county of Dane and State of Wisconsin, have invented certain new and useful Improvements in Dust Sprayers, of which the following is a specification.

This invention relates to dust-spraying machines of that type which are designed and adapted to spray vermin, fungus and insect-destroying powder on trees, bushes, shrubs and plants through the use of a rotary fan or blower; the machine of the present invention being designed mainly for dusting fruit trees and field crops.

In two co-pending applications filed by me on the 10th day of July, 1922, Serial Nos. 574,008 and 574,009, I have disclosed dusting machines comprising a gas engine, a rotary fan driven by the engine, and a dust hopper all rigidly united in a single unitary structure which may conveniently be mounted on the frame or floor of a vehicle for transporting the same through the orchard or field. The machine of my present invention embodies the same broad structural features, but differs from the machines of the aforesaid applications in respect to several specific details of structure and organization. In the machines of said applications the dust hopper is arranged to deliver the powder or dust to a current of air heated by the engine in its passage to the intake side of the fan, so that the commingled air and dust pass through the fan, the object being to absorb any moisture in the powder or dust and thus produce a drier and more finely divided condition of the latter. In the machine of my present invention the air delivered by the fan is preheated by the engine, but the powder or dust is delivered to the air on the discharge side of the fan. Also in the aforesaid applications I have disclosed the use of an air-cooled gas engine, wherein the air induced by the fan is preheated by contact with the walls of the cylinder, or with an exhaust heater disposed across its path of flow, or both. In the machine of the present invention I show an arrangement well adapted to the use of a water-cooled gas engine; the preheating of the air being effected by an exhaust heater located in the path of the air flowing to the intake side of the fan.

In order that the invention may be clearly apprehended by persons skilled in the art, I have, in the accompanying drawing, illustrated a practical and approved embodiment thereof; and referring thereto—

Fig. 1 is an elevation partly in vertical section, of the combined engine, fan and exhaust heater;

Fig. 2 is a side elevation of the complete outfit viewed from the right of Fig. 1 and showing also the delivery pipe of the fan with the dust hopper mounted thereon; and Fig. 3 is a sectional plan of the discharge valve and agitator of the dust hopper, taken on the line 3—3 of Fig. 2.

Referring to the drawing, B designates as an entirety a base-frame or pedestal which constitutes a support or rest for the complete machine, the same being provided with apertured ears or lugs 5 by which it may readily be secured to the floor of the vehicle. Rigidly mounted on the base B is an upright gas engine, herein shown as of the water-cooled type, and designated as an entirety by E. This engine has a crank case 6, to one side of which is rigidly secured the casing F of a rotary fan or blower of the well-known tangential delivery type, said casing being bolted to the base at 5'. The inner wall of the fan casing has the usual central suction opening 8, and integral with or otherwise secured to said inner side wall is a short lateral extension that forms a fly-wheel chamber 9 to accommodate the engine fly-wheel 10, and an upper heater chamber 11 in which is disposed a device for preheating the air flowing to the fan by means of the exhaust of the engine, and hereinafter more particularly described. The upper chamber 11 communicates with the fly-wheel chamber 9 through a central opening 12.

13 designates the horizontal discharge or delivery pipe of the blower which is securely bolted to the base B, as indicated at 5ª in Fig. 2, and on the upper side of the pipe 13 is a neck 14 on which is supported and secured the dust hopper H. In the throat of the hopper H is a discharge mechanism for the powder or dust, which may be of any particular or approved type, preferably capable of being adjusted or graduated so as to vary the amount of dust delivered to the air blast. This mechanism as herein shown comprises a lower valve plate 15 fitted across the throat of the hopper and formed with a group of equally spaced radial holes 16, and an identical superposed plate or disc 17 formed with holes 18 corresponding in number and location to the holes of the lower plate, so that when the upper plate is revolved the two series of holes can be brought into complete or partial registration or completely occluded. Any desired or convenient means for adjusting the plate 17 may be used, but I have herein shown a horizontal worm shaft 19 carrying a worm 20 in mesh with a worm wheel sector 21 forming part of the periphery of the disc 17; the shaft 19 being equipped with a hand wheel 22. To insure a continuous and uniform flow of the powder while the machine is in operation, an agitator or stirrer is preferably added to the hopper H, and this may conveniently take the form of a sweep 23 directly overlying the valve plate 17 and fast on the lower end of a vertical shaft 24. This latter shaft is driven from the fan shaft by a pulley 25 on the latter, a belt 26, a pulley 27 on the overhanging end of a shaft 28 journaled in and across the top of the hopper H and a worm and worm wheel 29 from shaft 28 to agitator shaft 24.

The fan 30 is, in the embodiment of the invention illustrated, directly driven by the engine shaft by being mounted on an extension of the latter beyond the fly-wheel 10, as clearly shown in Fig. 1.

The air induced by the fan is preheated by the engine exhaust by being caused to flow through a heater located in the chamber 11. 31 designates a pipe leading from the exhaust of the engine and connected, as by a T-coupling 32, to a pair of oppositely disposed exhaust pipe extensions 33. Encircling the pipes 33 are a pair of hollow grids 34, the outer ends of which are in free communication with the atmosphere, while their inner ends are open to the suction effect of the fan through the chamber 11, port or opening 12, and fly-wheel chamber 9. The grids 34 become highly heated by conduction from the exhaust pipes 33, so that the air drawn through the said grids is sufficiently heated to effect a drying and comminuting action on the powder or dust during the travel of the commingled air and dust through the hose or delivery pipes and nozzles of the machine. The operation or functioning of the apparatus will be quite evident from the foregoing description of its structure. Those advantages which it has in common with the machine of my aforesaid companion applications reside partly in the simplicity, compactness and unitary character of the structure, and partly in the preheating of the air which forms the vehicle for the powder or dust as the latter is carried to the points of application. The machine of the present invention is somewhat better adapted to be carried by narrow vehicles where arched or field conditions may require such vehicles, than the machines of my companion applications; and is likewise better adapted for use with powders which, for any reason, it may not be practicable or desirable to transmit through the fan. The heating of the air blast which carries the powder or dust is a feature of great value and advantage in a machine of this character, since the effective dusting of the objects treated depends entirely upon having the dust ground very fine so that it will adhere to the foliage and stems of the plants, and as a considerable part of the material used very readily absorbs moisture, some of it being deliquescent, the heated air will absorb any moisture contained in the dust, discharging the latter in a more finely divided condition and better adapted to its purpose.

I claim:

1. In a dusting machine, in combination, a base frame, a vertical gas engine having its crank case mounted on said base frame, a rotary fan rigidly connected on its intake side to one side of said crank case and having a tangential discharge pipe, said fan being driven by said engine and supported on said base frame, means for heating the air induced by said fan through the agency of the engine exhaust, and a dust hopper mounted on said discharge pipe and delivering dust to the air flowing through the latter.

2. In a dusting machine, in combination, a gas engine, a fan driven by said engine and having a discharge pipe, a dust hopper mounted on said discharge pipe and delivering dust to the air flowing through the latter, an air intake chamber adjacent to the suction side of said fan, an air heater located in said chamber, and means for passing the exhaust from said engine through said heater.

3. In a dusting machine, in combination, a base frame, a vertical gas engine having its crank case mounted on said base frame, a rotary fan rigidly connected to one side of said crank case and having a tangential discharge pipe, a dust hopper mounted on said discharge pipe and delivering dust to the air flowing through the latter, an air intake chamber adjacent to the suction side of said fan, an air heater located in said chamber, and a pipe connecting the exhaust of the engine with said heater.

WARREN W. GORE.